(12) United States Patent
Sugimoto (10) Patent No.: US 8,646,295 B2
(45) Date of Patent: Feb. 11, 2014

(54) STEERING LOCK DEVICE

(75) Inventor: Koichiro Sugimoto, Kanagawa-ken (JP)

(73) Assignee: Alpha Corporation, Yokohama-Shi, Kanagawa-Ken (JP)

( * ) Notice: Subject to any disclaimer, the term of this patent is extended or adjusted under 35 U.S.C. 154(b) by 228 days.

(21) Appl. No.: 13/062,959

(22) PCT Filed: Sep. 11, 2009

(86) PCT No.: PCT/JP2009/065901
§ 371 (c)(1),
(2), (4) Date: Mar. 9, 2011

(87) PCT Pub. No.: WO2010/029990
PCT Pub. Date: Mar. 18, 2010

(65) Prior Publication Data
US 2011/0167885 A1    Jul. 14, 2011

(30) Foreign Application Priority Data
Sep. 12, 2008   (JP) ................. P2008-235005

(51) Int. Cl.
*B60R 25/02*   (2013.01)
(52) U.S. Cl.
USPC ............................. 70/186; 70/252
(58) Field of Classification Search
USPC .......................... 70/181–187, 252
See application file for complete search history.

(56) References Cited

U.S. PATENT DOCUMENTS 1,542,560 A * 6/1925 Krautter ................. 70/185
2,295,807 A * 9/1942 Sandberg ................ 70/252

(Continued)

FOREIGN PATENT DOCUMENTS

| JP | 11-310104 A | 11/1999 |
| JP | 2008-238949 A | 10/2008 |
| WO | 2008/056728 A1 | 5/2008 |

OTHER PUBLICATIONS

Official Action issued on Jun. 25, 2013 in the counterpart Japanese application No. 2008-235005 with English translation.

(Continued)

*Primary Examiner* — Peter M Cuomo
*Assistant Examiner* — David R Hare
(74) *Attorney, Agent, or Firm* — Nath, Goldberg & Meyer; Jerald L. Meyer; Scott C. Langford (57) ABSTRACT

A steering lock device includes a main frame, a lock insertion hole formed on the main frame, a lock member slidably disposed in the lock insertion hole, a pin insertion portion formed on the lock member, a stopper housing portion formed on the main frame, a stopper pin housed in the stopper housing portion, and a trigger detachably disposed on the main frame. The stopper pin is urged toward a latch position by a stopper, and engaged, in a state of positioning at the latch position, with the pin insertion portion of the lock member positioning at the lock position. The trigger holds, in a state of being attached on the main frame, the stopper pin at an unlatch position by contacting with the stopper pin. First stepped portions for engaging with the stopper pin positioning at the latch position are disposed in a side of the unlock position, around an opening of the stopper housing portion and on a wall surface of the lock insertion hole facing to the opening. Since the lock member is firmly held at the lock position by the stopper pin even if a cover or a coil spring urging the lock member is removed, an improper unlock of the lock member can be prevented.

6 Claims, 10 Drawing Sheets

(56) References Cited

U.S. PATENT DOCUMENTS

| | | | |
|---|---|---|---|
| 2,343,976 A * | 3/1944 | Jacobi | 70/252 |
| 4,771,619 A * | 9/1988 | Shiramizu et al. | 70/186 |
| 5,415,019 A * | 5/1995 | Perez | 70/210 |
| 6,516,640 B2 * | 2/2003 | Jacobs et al. | 70/186 |
| 7,121,126 B2 * | 10/2006 | Zillmann | 70/186 |
| 7,140,213 B2 * | 11/2006 | Feucht et al. | 70/186 |

OTHER PUBLICATIONS

Official Action issued on Jan. 30, 2013 in the counterpart European application No. 09813136.0.

Office Action issued in European Counterpart application No. 09813136.0, dated Sep. 3, 2013.

* cited by examiner

STEERING LOCK DEVICE

This is a National Phase Application filed under 35 U.S.C. 371 as a national stage of PCT/JP2009/065901, filed on Sep. 11, 2009 and claims benefit from Japanese Patent Application No. P2008-235005, filed on Sep. 12, 2008, the entire content of which is hereby incorporated by reference in its entirety.

TECHNICAL FIELD

The present invention relates to a steering lock device that locks rotation of a steering shaft of an automobile.

BACKGROUND ART

Figure 10:
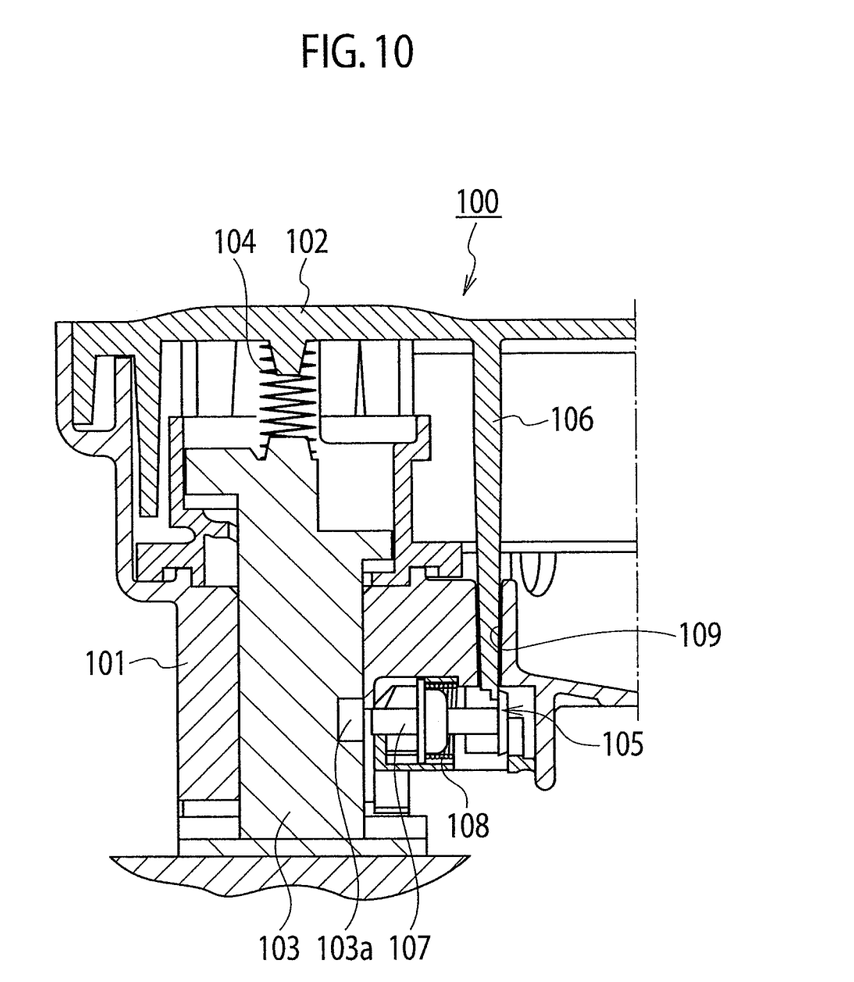
FIG. 10 is a cross-sectional view of a conventional steering lock device.

As a conventional steering lock device, one disclosed in a U.S. Pat. No. 7,121,126 is known. As shown in FIG. 10, the steering lock device 100 has a component housing chamber formed by a main frame 101 and a cover 102. In the component housing chamber, a lock member 103, a coil spring 104, a stopper 105, and a trigger 106 are provided. The lock member 103 shifts between its lock position for prohibiting rotation of a steering shaft (not shown) and its unlock position for allowing the rotation of the steering shaft. The coil spring 104 urges the lock member 103 toward a lock direction (downward in FIG. 10). The stopper 105 can hold the lock member at the lock position. The rod-shaped trigger 106 is formed integrally with the cover 102 and can hold the stopper 105 in its inoperable state.

In addition, the stopper 105 includes a stopper pin 107 and a stopper spring 108. The stopper pin 107 is held movably in a direction perpendicular to a moving direction of the lock member 103, and can be inserted into a recess 103a of the lock member 103. The stopper spring 108 is composed of a coil spring that urges the stopper pin 107 toward the lock member 103. Note that, although the stopper pin 107 is urged toward the lock member 103 (leftward in FIG. 10) by the stopper spring 108, it is normally held in a state where the stopper 105 is inoperable due to engagement between an end of the trigger 106 and the stopper pin 107.

By locking the steering shaft using the lock member 103, theft of a parked vehicle can be prevented. Even if the cover 102 is removed from the main frame 101 in order to directly operate the lock member 103 toward its unlock position, the trigger 106 is pulled out together with the cover, so that the stopper pin 107 is moved by the stopper spring 108 and thereby inserted into the recess 103a. As a result, since the lock member 103 is held at its lock position, an improper unlock of the lock member 103 can be restricted and thereby a forcible unlock of a lock state of the steering shaft can be prevented.

SUMMARY OF THE INVENTION

However, in the above steering lock device 100, there may be a probability of a removal of the stopper spring 108 due to an insertion of something from a trigger hole 109 opened after pulling-out of the trigger 106 together with the cover 102. Since the stopper pin 107 can be moved due to the removal of the topper spring 108, it can be unlocked by pulling-out of the lock member 103 after disengagement between the stopper pin 107 and the lock member 103.

Therefore, an object of the present invention is to provide a steering lock device that can prevent an improper unlock of a lock member by holding the lock member at its lock position even if a stopper spring that urges a stopper pin is removed and thereby prevent thief of a parked vehicle.

An aspect of the present invention provides a steering lock device that includes a lock member that is disposed in a lock insertion hole formed on a main frame, and can slide between a lock position for prohibiting rotation of a steering shaft and a unlock position for allowing the rotation of the steering shaft; a pin insertion portion formed on the lock member; a stopper pin that is housed in a stopper housing portion formed on the main frame, can slide between an unlatch position for allowing slide of the lock member and a latch position for holding the lock member at the lock position by engaging with the pin insertion portion, and is urged from the unlatch position toward the latch position by a stopper spring housed in the stopper housing portion; and a trigger that is detachably disposed on the main frame, and holds the stopper pin at the unlatch position by contacting with the stopper pin. First stepped portions for engaging with the stopper pin positioning at the latch position are disposed in a side of the unlock position, around an opening of the stopper housing portion and on a wall surface of the lock insertion hole facing to the opening.

According to the above aspect, the first stepped portions for engaging with the stopper pin positioning at the latch position are disposed in the side of the unlock position, around the opening of the stopper housing portion and on the wall surface of the lock insertion hole facing to the opening. Therefore, when the stopper spring is removed together with the trigger in order to move the lock member toward the unlock position, the stopper pin moves together with the lock member to engage with the first stepped portions. As a result, the stopper pin is not brought back to the unlatch position and the lock member is firmly held at the lock position. Therefore, even when the stopper spring is removed together with the trigger, the lock member is firmly held at the lock position, so that an improper unlock of the lock member is prevented and theft of a parked vehicle can be prevented.

Here, it is preferable that second stepped portions for engaging with the stopper pin positioning at the latch position are disposed in a side of the lock position, around the opening of the stopper housing portion and on the wall surface of the lock insertion hole facing to the opening.

According to this, the second stepped portions for engaging with the stopper pin positioning at the latch position are disposed in the side of the lock position, around the opening of the stopper housing portion and on the wall surface of the lock insertion hole facing to the opening. Therefore, when the stopper spring is removed together with the trigger, the stopper pin drops downward due to its own weight with inserted into the pin insertion portion to engage with the second stepped portions. As a result, the stopper pin is not brought back to the unlatch position and the lock member is firmly held at the lock position. Therefore, an improper unlock of the lock member is prevented more effectively and theft of a parked vehicle can be prevented more effectively.

In addition, it is preferable that a direction perpendicular to both a slide direction of the lock member and a slide direction of the stopper pin is defined as a first direction is assumed as a first direction, third stepped portions for engaging with the stopper pin positioning at the latch position are disposed along the first direction, around the opening of the stopper housing portion and on the wall surface of the lock insertion hole facing to the opening, and a sloped portion sloped along the first direction is disposed at the pin insertion portion of the lock member.

According to this, the third stepped portions for engaging with the stopper pin positioning at the latch position are disposed along the first direction, around the opening of the stopper housing portion and on the wall surface of the lock insertion hole facing to the opening. In addition, the sloped portion sloped along the first direction is disposed at the pin insertion portion of the lock member. Therefore, when the stopper spring is removed together with the trigger in order to move the lock member toward the unlock position, the stopper pin is moved by the sloped portion to engage with the third stepped portions. As a result, the stopper pin is not brought back to the unlatch position and the lock member is firmly held at the lock position. Therefore, an improper unlock of the lock member is prevented more effectively and theft of a parked vehicle can be prevented more effectively.

Further, it is preferable that the stopper pin has an almost cylindrical shape, and a center portion of the sloped portion has a chevron shape projected from the lock side toward the unlock side.

According to this, since the stopper pin never stays at the top of the chevron-shaped sloped portion, the stopper pin is not brought back to the unlatch position and the lock member is firmly held at the lock position. Therefore, an improper unlock of the lock member is prevented more effectively and theft of a parked vehicle can be prevented more effectively.

BRIEF DESCRIPTION OF THE DRAWINGS

FIG. 3 (*a*) is a side view of the steering lock device according to the embodiment of the present invention and (*b*) is a bottom view.

DESCRIPTION OF EMBODIMENT(S)

Hereinafter, a steering lock device according to an embodiment of the present invention will be explained with reference to the drawings.

Figure 1:
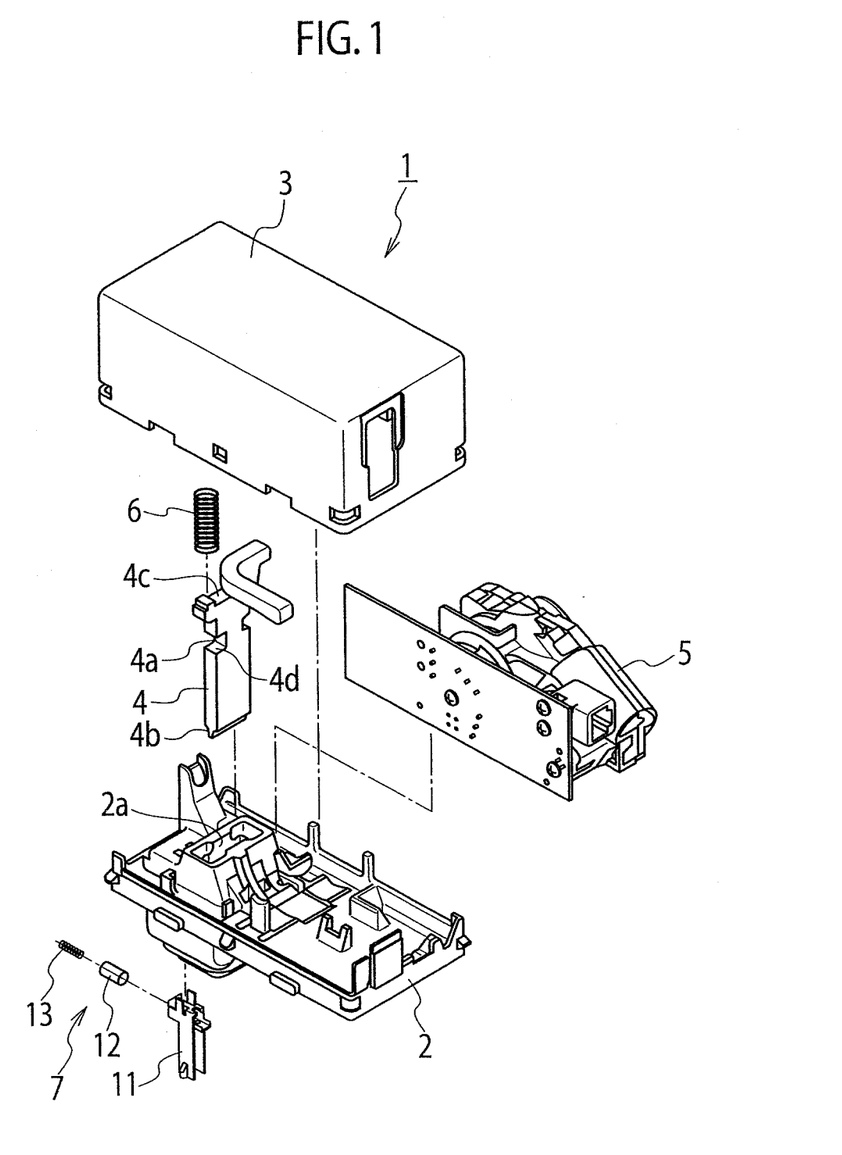
FIG. 1 is a perspective view of a steering lock device according to an embodiment of the present invention.
Figure 2:
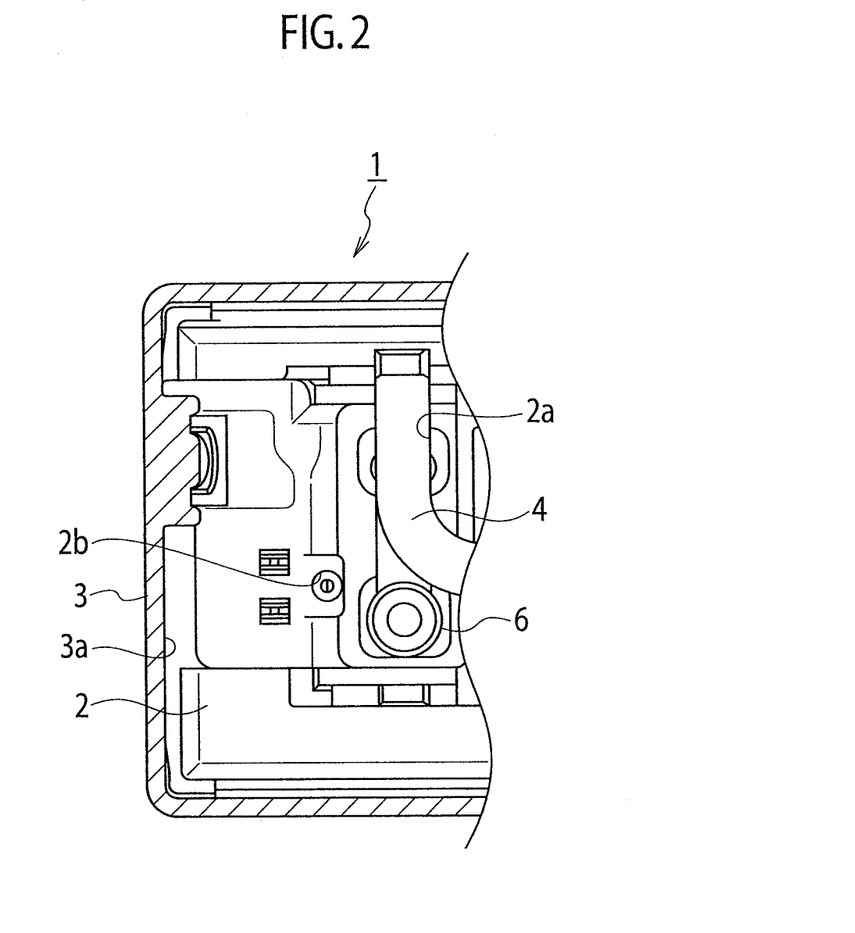
FIG. 2 is a partial plan of a component housing chamber in the steering lock device according to the embodiment of the present invention.
Figure 3:
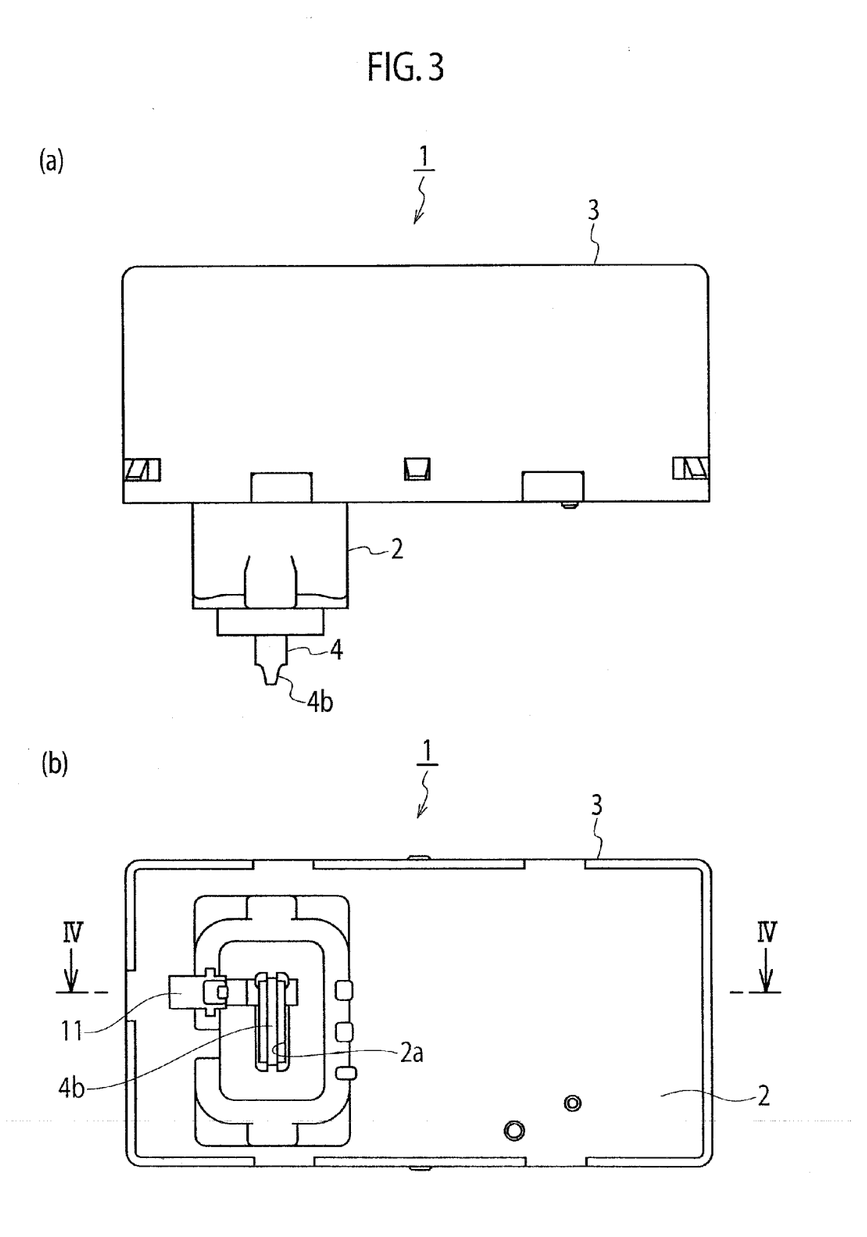

As shown in FIG. 1, the steering lock device 1 according to the present embodiment includes a main frame 2 and a cover 3. The main frame 2 and the cover 3 are attached with each other to form a component housing chamber 3*a* therein. In addition, the steering lock device 1 includes a lock member 4, an actuator 5, a coil spring (an urging unit) 6, a stopper 7, and a trigger 8 (see FIG. 4). The lock member 4 shifts between its lock position for prohibiting rotation of a steering shaft (not shown) and its unlock position for allowing the rotation of the steering shaft. The actuator 5 is disposed in the component housing chamber 3*a* and shifts the lock member 4 toward the lock position or the unlock position. The coil spring 6 is attached to the inside of the cover 3 to urge the lock member 4 toward a lock direction (downward in FIG. 4). The stopper 7 can hold the lock member 4 at the lock position. The trigger 8 is formed integrally on an inner surface of the cover 3 and can hold the stopper 7 in an inoperable state (at an unlatch position).

As shown in FIGS. 1 to 4, a lock insertion hole 2*a*, a trigger insertion hole 2*b* and a sub frame attachment portion 2*c* are provided on the main frame 2. The lock member 4 is slidably inserted into the lock insertion hole 2*a*. The trigger 8 is slidably inserted into the trigger insertion hole 2*b*. A sub frame 11 is attached to the sub frame attachment portion 2*c*. An after-mentioned stopper housing portion 14 is opened on a wall surface of the lock insertion hole 2*a*.

Figure 6:
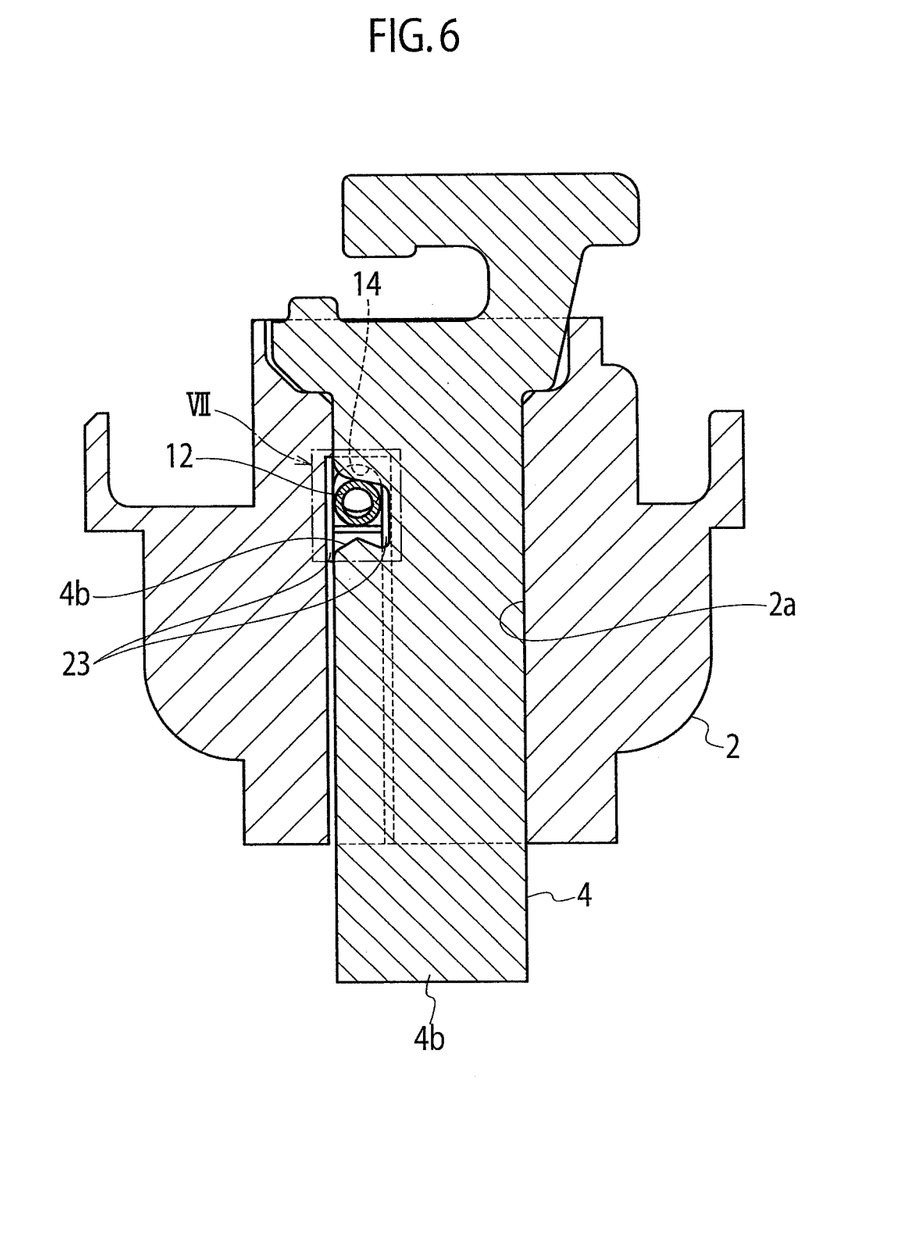
FIG. 6 is a cross-sectional view taken along a line VI-VI shown in FIG. 5.

First stepped portions 21, second stepped portion 22, and third stepped portions 23 are formed in the stopper housing portion 14. The first stepped portions 21 are disposed in an unlock side (upper side in FIG. 4) of the lock member 4 at an opening of the stopper housing portion 14 on an inner surface of the lock insertion hole 2*a*. The second stepped portions 22 are disposed in a lock side (lower side in FIG. 4) of the lock member 4 at the above-mentioned opening. The third stepped portions 23 are disposed in lateral sides (left/right sides in FIG. 6) at the above-mentioned opening. A stopper pin 12 can be engaged with the first stepped portions 21, the second stepped portions 22, and the third stepped portions 23. Note that, when a direction perpendicular to both a slide direction of the lock member and a slide direction of the stopper pin 12 is defined as a first direction, the third stepped portions 23 are located on the first direction (lateral direction in FIG. 6) at the above-mentioned opening.

As shown in FIG. 1, the lock member 4 is a rigid planar member, and an engagement end 4*b* and a spring receive portion 4*c* are formed thereon. The engagement end 4*b* is formed at a tip end of the lock member 4, and can be engaged with a steering shaft. The spring receive portion 4*c* is formed at a base end, and contacted with the coil spring 6. The lock member 4 is disposed within the lock insertion hole 2*a* formed on the main frame 2. The lock member 4 can slide between the lock position for prohibiting rotation of the steering shaft and the unlock position for allowing the rotation of the steering shaft.

Figure 7:
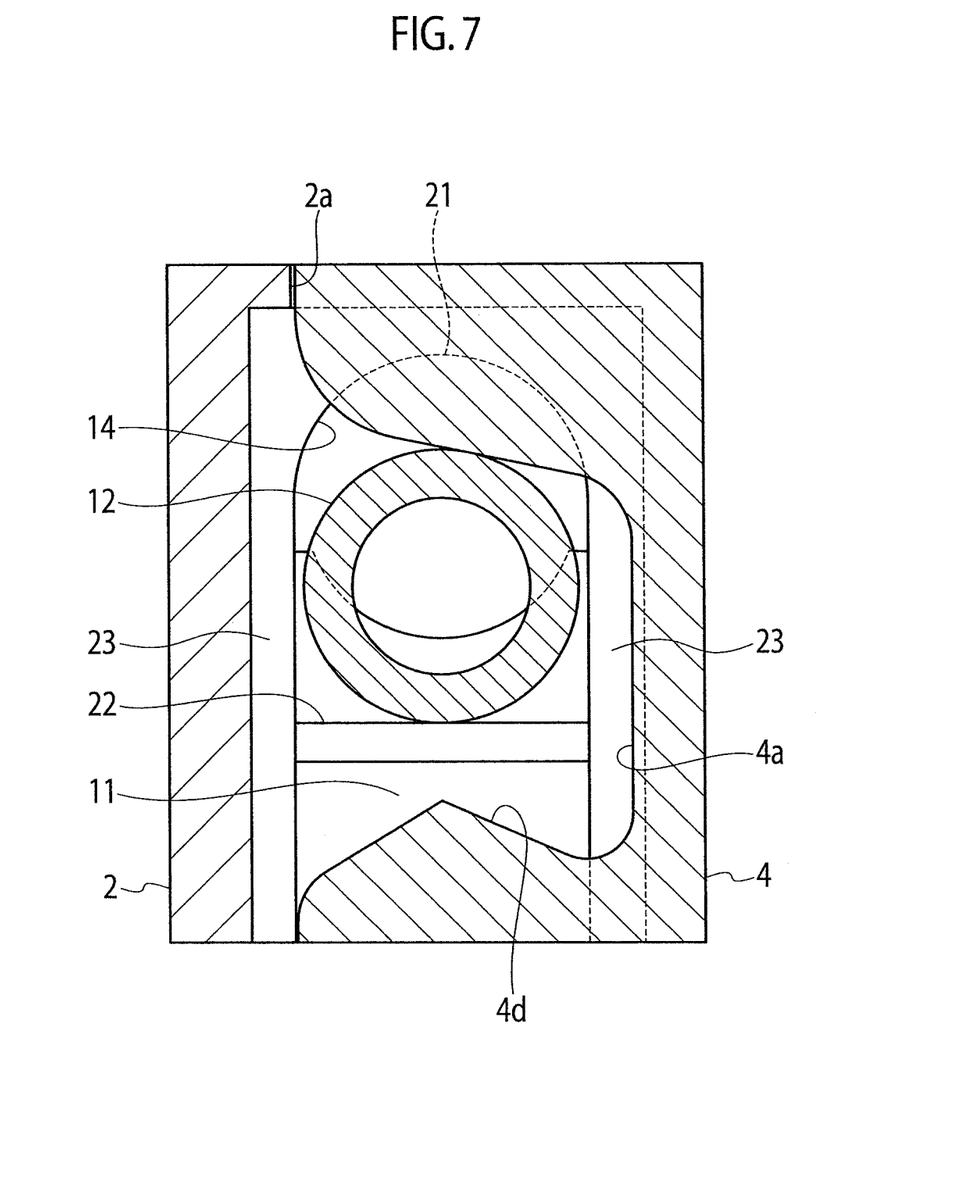
FIG. 7 is a partially enlarged view of a section VII showing in FIG. 6.
Figure 8:
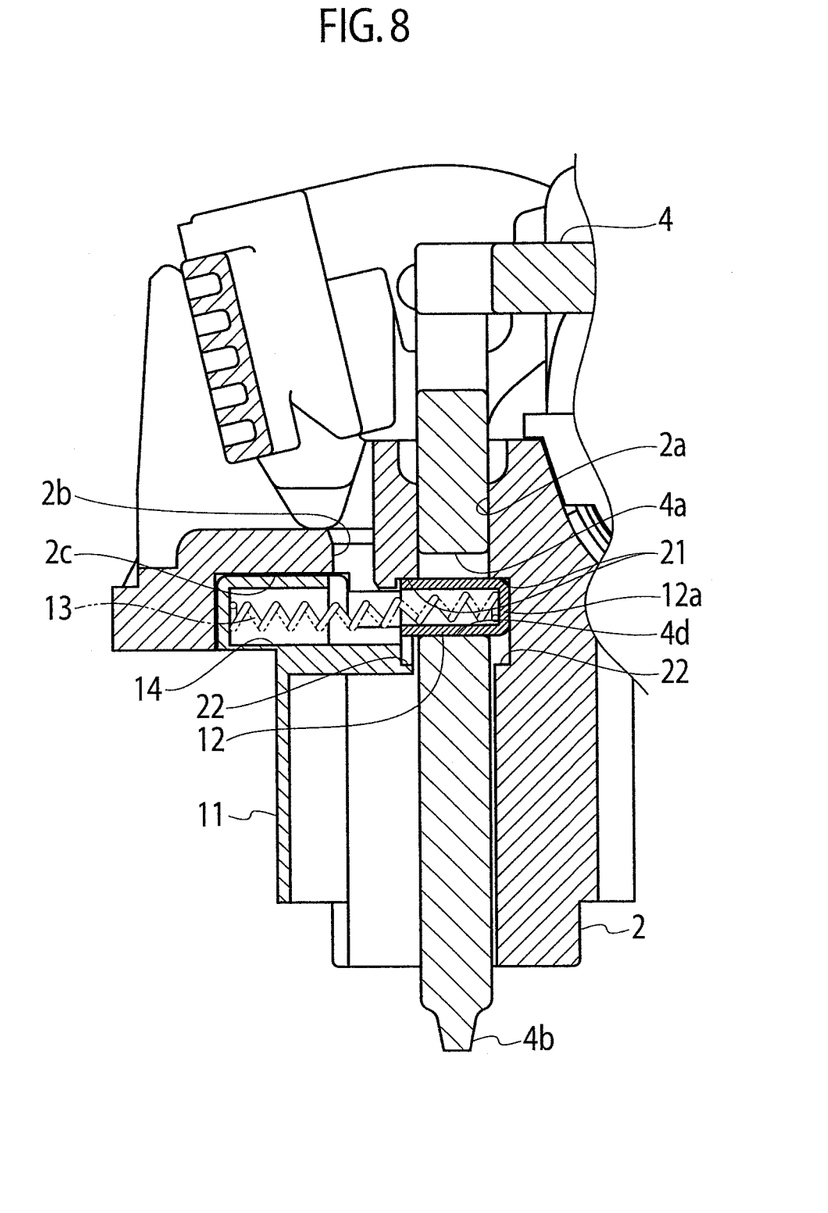
FIG. 8 is a cross-sectional view (a state where a lock member is about to be pulled out after the cover is removed) taken along the line IV-IV shown in FIG. 3(*b*).

In addition, a pin insertion portion 4*a* is formed on the lock member 4. The pin insertion portion 4*a* is formed so as to penetrate the lock member 4 in its thickness direction (the slide direction of the stopper pin 12). In the present embodiment, the pin insertion portion 4*a* is formed as a cutout on an edge extending along the slide direction of the lock member 4 (see FIG. 7). A sloped portion 4*d* that is sloped along the above-mentioned first direction is provided on an inner surface on a lock side (lower in FIG. 7) of the pin insertion portion 4*a*. The center portion of the sloped portion 4*d* is formed as a chevron shape projected from the lock side toward the unlock side (upper in FIG. 7). Note that, although the pin insertion portion 4*a* is formed as a cutout in the present embodiment, it may be formed as a through hole.

As shown in FIG. 1, the stopper 7 is composed of the sub frame 11, the stopper pin 12, and a stopper spring 13. The sub frame 11 includes the cylindrical stopper housing portion 14. The sub frame 11 is to be attached to the main frame 2. The stopper housing portion 14 intersects perpendicularly to the lock insertion hole 2*a* in a state where the sub frame 11 is attached to the main frame 2. The stopper pin 12 and the stopper spring 13 are housed in the stopper housing portion 14.

Figure 4:
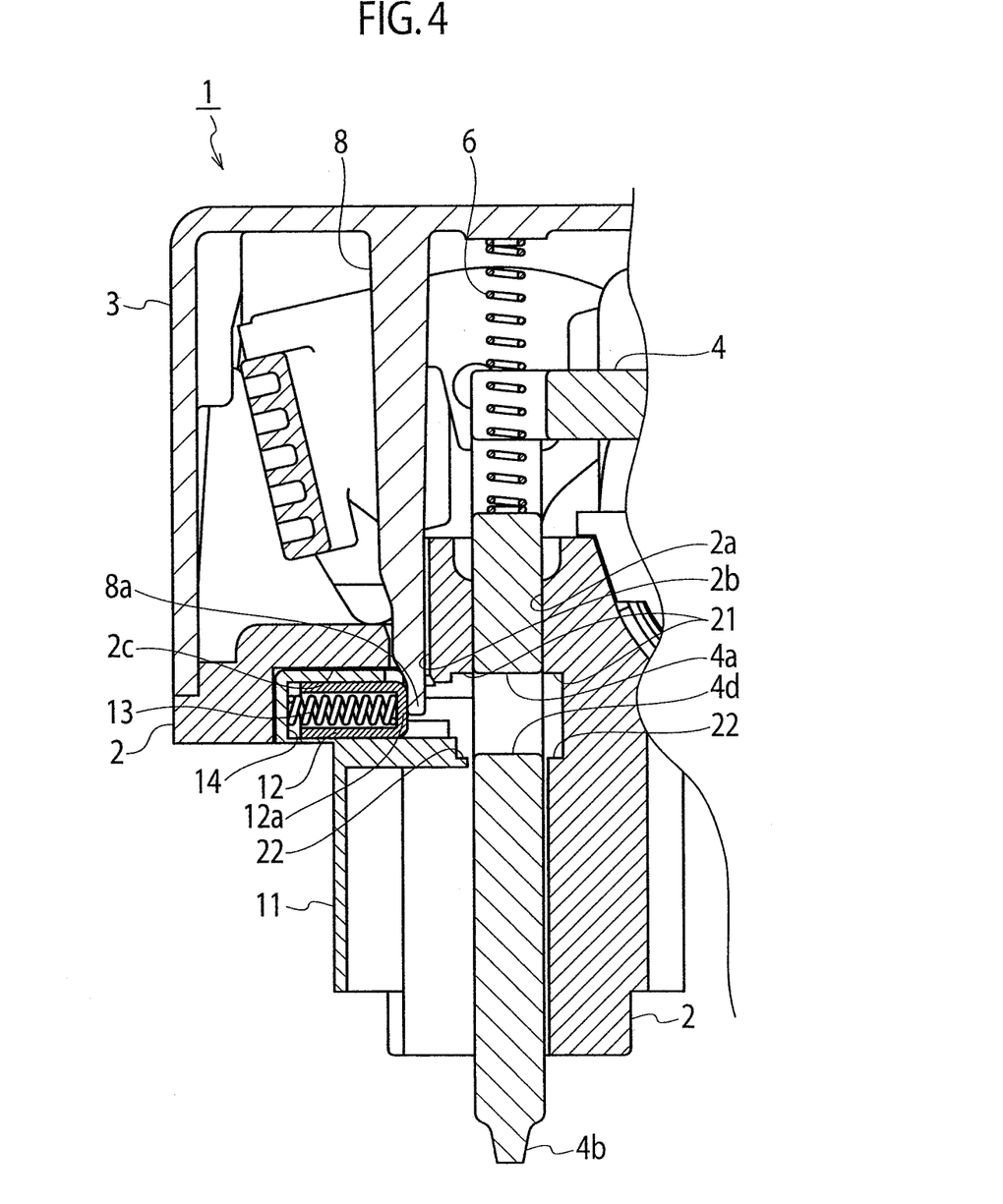
FIG. 4 is a cross-sectional view (cover is attached) taken along a line IV-IV shown in FIG. 3(*b*).
Figure 5:
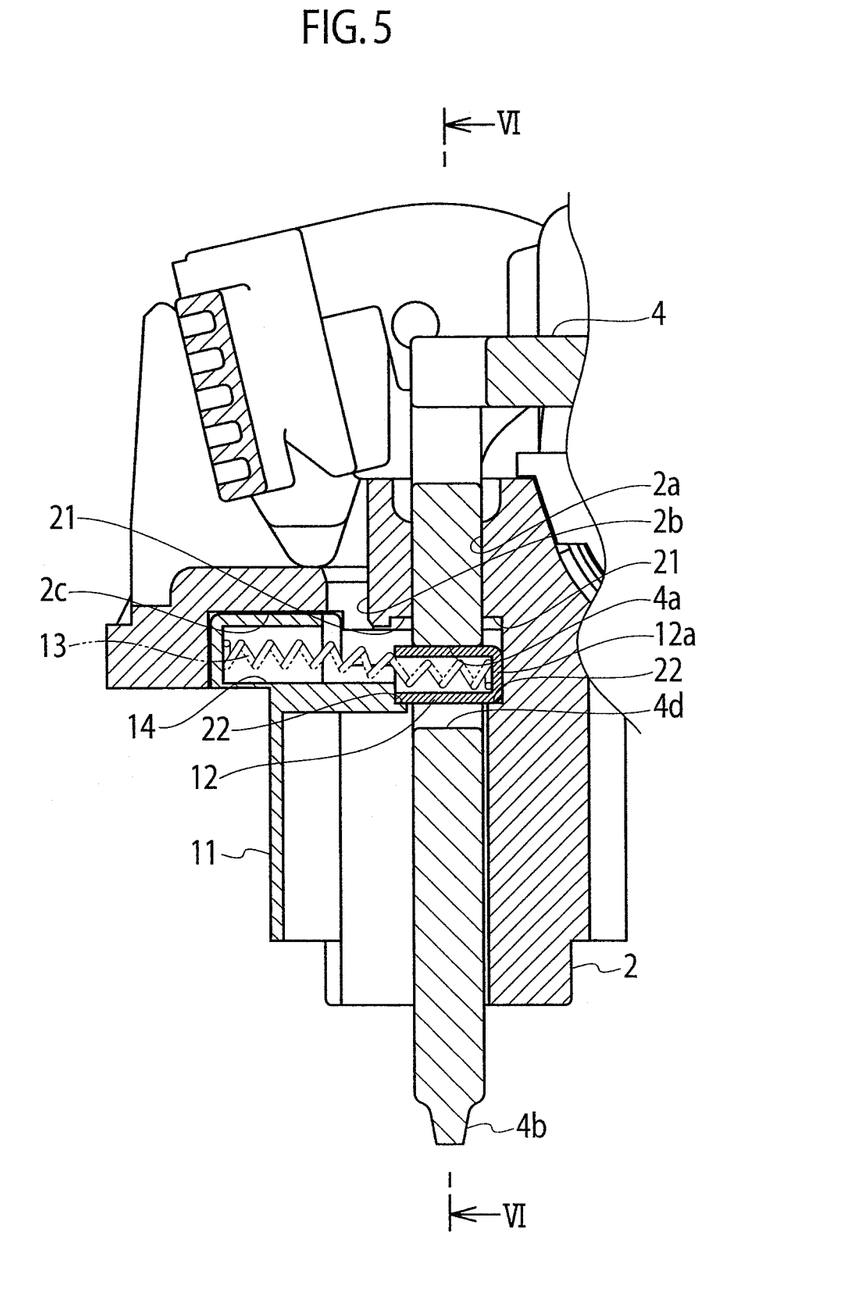
FIG. 5 is a cross-sectional view (cover is removed) taken along the line IV-IV shown in FIG. 3(*b*).

As show in FIGS. 4 and 5, the stopper pin 12 has a bottomed tube shape. The stopper pin 12 slides between an unlatch position (FIG. 4) located inside of the stopper housing portion 14 and a latch position (FIG. 5) located outside of the stopper housing portion 14. The stopper spring (coil spring in the present embodiment) 13 is housed in the inside of the stopper pin 12. The stopper pin 12 is urged from the unlatch position toward the latch position (rightward in FIG. 4) by the stopper spring 13. While the stopper pin 12 positions at the unlatch position, the stopper pin 12 and the lock member 4 is not engaged with each other even if the lock member 4 is at any position (see FIG. 4). On the other hand, when the stopper pin 12 positions at the latch position, the stopper pin 12 locates within the pin insertion portion 4a of the lock member 4 positioning at the lock position (see FIG. 5).

As shown in FIG. 4, the trigger 8 is detachable from the main frame 2. The trigger 8 is inserted into the trigger insertion hole 2b provided on the main frame 2 at ordinary times. In the state where the trigger 8 is inserted in the trigger insertion hole 2b, a tip end 8a of the trigger 8 contacts with an end surface 12a of the stopper 12 being inside the stopper housing portion 14, so that the stopper 12 is held at the unlatch position. At this state, the stopper spring 13 is compressed within the stopper pin 12.

Next, behaviors of the above-described steering lock device 1 will be explained. While the steering shaft is locked with the lock member 4 being at the lock position, the stopper 7 is held in an inoperable state by the trigger 8 (see FIG. 4). When the cover 3 is removed from the main frame 2, the trigger 8 integrally formed with the cover 3 and the coil spring 6 are also removed. As a result, the contact between the tip end of the trigger 8 and the stopper pin 12 is released and then the stopper pin 12 is moved to the latch position by the stopper spring 13. The stopper pin 12 is rushed into the pin insertion portion 4a of the lock member 4 (see FIG. 5). If it is tried to pull out the lock member 4 under this state, the lock member 4 is cannot be pulled away and held at the lock position because the stopper pin 12 and the lock member 4 are latched with each other and both ends of the stopper pin 12 are stuck on the first stepped portions 21.

In addition, if the stopper spring 13 is removed away through the trigger insertion hole 2b under the above-mentioned state, the stopper pin 12 will drop downward and contacts with the second stepped portions 22. Then, the stopper pin 12 is prevented from moving toward the unlatch position and held at the latch position due to the contact between the stopper pin 12 and the second stepped portions 22. Therefore, the engagement between the stopper pin 12 and the lock member 4 is maintained, so that the lock member 4 is held at the lock position without pulled away (see FIGS. 5 to 7).

Figure 9:
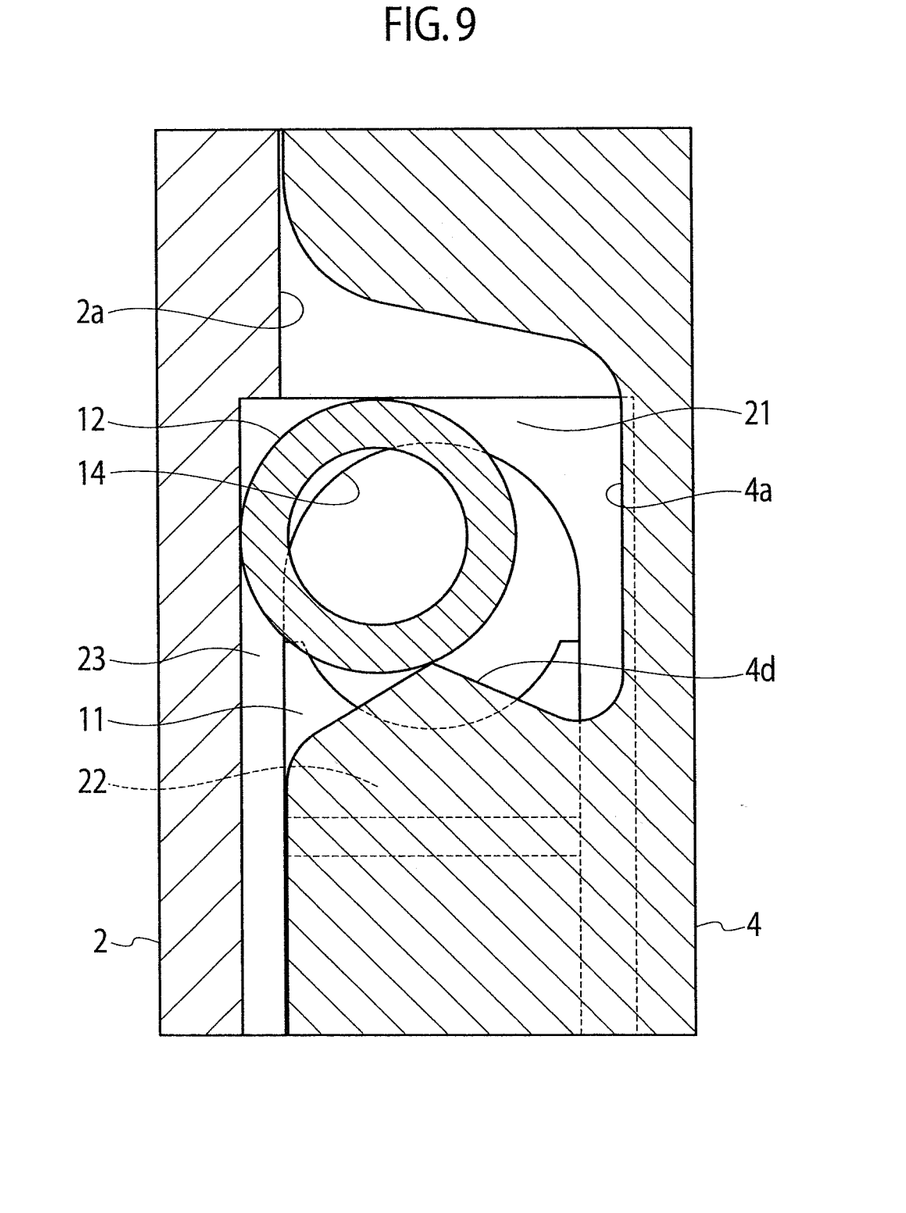
FIG. 9 is a partially enlarged view of the section VII showing in FIG. 6 (the state where the lock member is about to be pulled out after the cover is removed).

Further, if it is tried to disengage the stopper pin 12 and the second stepped portions 22 in order to move the stopper pin 12 toward the unlatch position by moving the lock member 4 to lift up the stopper pin 12, the stopper pin 12 is pushed out to the third stepped portion 23 by the sloped portion 4d (see FIG. 9). Since the stopper pin 12 is stuck on the third stepped portion 23, it cannot be moved toward the unlatch position. In addition, if it will be tried to move the stopper pin 12 by generating vibrations, the stopper pin 12 will moved to an opposite-side slope due to the chevron shape of the sloped portion 4d. Therefore, the stopper pin 12 cannot be moved toward the unlatch position if the vibrations will be generated, and is held at the latch position. In this manner, the engagement between the stopper pin 12 and the lock member 4 is firmly maintained, so that the lock member 4 cannot be pulled away and is held at the lock position.

As explained above, in the present invention embodiment, not only when the cover 3 is removed from the main frame 2 but also when the stopper spring 13 is removed, the stopper pin 12 is stuck on each of the stepped portions 21, 22, and 23 to hold the lock member 4 at the lock position. As a result, an improper unlock of the lock member 4 can be prevented and then theft of a parked vehicle can be prevented.

In the above embodiment, the stepped portions are disposed around the opening of the stopper housing portion and on the wall surface of the lock insertion hole facing to the opening, respectively. By this simple structure, an improper unlock can be prevented without increasing the number of components.

In addition, by providing the sloped portion 4d sloped along the above-mentioned first direction on the pin insertion portion 4a and forming the stopper pin 12 almost cylindrically-shaped, the stopper pin 12 can be shifted along the first direction by the sloped portion 4d to be stuck on the third stepped portion 23 even when it is tried to move the lock member 4 toward the unlock position by removing the stopper spring 13. Therefore, the stopper pin 12 cannot moved to the unlock position, so that the lock member can be held at the lock position. As a result, an improper unlock of the lock member 4 can be prevented more effectively and then theft of a parked vehicle can be prevented more effectively. Further, the stopper pin 12 never stay at a top of the chevron-shaped sloped portion 4d, so that the stopper pin 12 cannot be moved to unlock position and then the lock member can be held at the lock position firmly. According to this, an improper unlock of the lock member can be prevented more effectively.

Although the preferred embodiment according to the present invention was described above, the present invention is not limited the above embodiment and can be modified variously. For example, although the trigger 8 and the cover 3 are formed integrally in the above embodiment, the trigger 6 and the coil spring 6 may be formed integrally.

The invention claimed is:
1. A steering lock device comprising:
 a lock member that is disposed in a lock insertion hole formed on a main frame, and can slide between a lock position for prohibiting rotation of a steering shaft and a unlock position for allowing the rotation of the steering shaft;
 a pin insertion portion formed on the lock member;
 a stopper pin that is housed in a stopper housing portion formed on the main frame, can slide between an unlatch position for allowing slide of the lock member and a latch position for holding the lock member at the lock position by engaging with the pin insertion portion, and is urged from the unlatch position toward the latch position by a stopper spring housed in the stopper housing portion;
 a cover detachably attached to the main frame for preventing an access to the lock member and the stopper pin; and
 a trigger that holds the stopper pin at the unlatch position by contacting with the stopper pin and is disengaged with the stopper pin when the cover is removed from the main frame to enable the stopper spring to slide the stopper pin to the latch position, wherein
 first stepped portions formed in the main frame that engage with the stopper pin at the latch position are disposed on a side of the unlock position, around an opening of the stopper housing portion and on a wall surface of the lock insertion hole facing to the opening.
2. The steering lock device according to claim 1, wherein second stepped portions formed in the main frame that engage with the stopper pin at the latch position are disposed on a side of the lock position, around the open- ing of the stopper housing portion and on the wall surface of the lock insertion hole facing to the opening.

3. The steering lock device according to claim 1, wherein
a direction perpendicular to both a slide direction of the lock member and a slide direction of the stopper pin is defined as a first direction,
lock member stepped portions formed in the lock member for engaging with the stopper pin positioning at the latch position are disposed along the first direction, around the opening of the stopper housing portion and on the wall surface of the lock insertion hole facing to the opening, and
a sloped portion sloped along the first direction is disposed at the pin insertion portion of the lock member.

4. The steering lock device according to claim 2, wherein
a direction perpendicular to both a slide direction of the lock member and a slide direction of the stopper pin is defined as a first direction,
lock member stepped portions formed in the lock member for engaging with the stopper pin positioning at the latch position are disposed along the first direction, around the opening of the stopper housing portion and on the wall surface of the lock insertion hole facing to the opening, and
a sloped portion sloped along the first direction is disposed at the pin insertion portion of the lock member.

5. The steering lock device according to claim 3, wherein
the stopper pin has an almost cylindrical shape, and
a center of the sloped portion has a chevron shape projected from the lock side toward the unlock side.

6. The steering lock device according to claim 4, wherein
the stopper pin has an almost cylindrical shape, and
a center portion of the sloped portion has a chevron shape projected from the lock side toward the unlock side.

* * * * *